(12) United States Patent
Kim et al.

(10) Patent No.: US 7,969,940 B2
(45) Date of Patent: Jun. 28, 2011

(54) METHOD AND SYSTEM FOR ASSIGNING RADIO RESOURCES IN CELLULAR SYSTEM USING WIRED RELAY STATIONS

(75) Inventors: Byung-Jik Kim, Seongnam-si (KR); Seong-Taek Hwang, Pyeongtaek-si (KR); Won-Jin Sung, Seoul (KR); Jin-Woo Choe, Seoul (KR); Jong-Hyun Park, Seoul (KR); Jong-Hyun Kim, Seoul (KR)

(73) Assignees: Samsung Electronics Co., Ltd., Maetan-Dong, Yeongtong-Gu, Suwon-Si, Gyeonggi-Do, Korea (KR); Industry-University Cooperation Foundation Sogang University, Sinsu-Dong, Mapo-Gu, Seoul (KR)

( * ) Notice: Subject to any disclaimer, the term of this patent is extended or adjusted under 35 U.S.C. 154(b) by 865 days.

(21) Appl. No.: 11/900,333

(22) Filed: Sep. 10, 2007

(65) Prior Publication Data

US 2008/0119194 A1      May 22, 2008

(30) Foreign Application Priority Data

Nov. 21, 2006   (KR) .................. 10-2006-0115087

(51) Int. Cl.
    *H04W 4/00*   (2009.01)
(52) U.S. Cl. ....................... 370/329; 370/341
(58) Field of Classification Search .............. None
    See application file for complete search history.

(56) References Cited

U.S. PATENT DOCUMENTS

| | | | |
|---|---|---|---|
| 7,400,856 B2 * | 7/2008 | Sartori et al. | 455/7 |
| 2004/0258096 A1 * | 12/2004 | Yoon et al. | 370/498 |
| 2005/0124352 A1 | 6/2005 | Fernandez-Corbaton et al. | |
| 2007/0133452 A1 * | 6/2007 | Li | 370/328 |
| 2007/0177545 A1 * | 8/2007 | Natarajan et al. | 370/331 |
| 2008/0186950 A1 * | 8/2008 | Zhu et al. | 370/350 |
| 2008/0268855 A1 * | 10/2008 | Hanuni et al. | 455/445 |

FOREIGN PATENT DOCUMENTS

| | | |
|---|---|---|
| JP | 05-055988 | 3/1993 |
| KR | 2003-49407 | 6/2003 |
| KR | 2006-96519 | 9/2006 |

* cited by examiner

*Primary Examiner* — Phirin Sam
(74) *Attorney, Agent, or Firm* — Cha & Reiter, LLC

(57) ABSTRACT

A method of assigning radio resources in a cellular system using wired Relay Stations (RSs) includes: a Base Station (BS) gathering feed-back control information of all Mobile Stations (MSs) via the RSs in a cell of the BS; a first process, wherein the MSs are divided into two groups according to a channel state of each MS; a second process, wherein sub-channels are dynamically assigned to MSs belonging to a group, in which a channel state of each MS is good, of the two groups; and a third process, wherein sub-channels are dynamically assigned to MSs belonging to a group, in which a channel state of each MS is bad, of the two groups by considering a resource state per RS and a channel gain between sub-channels.

7 Claims, 7 Drawing Sheets

METHOD AND SYSTEM FOR ASSIGNING RADIO RESOURCES IN CELLULAR SYSTEM USING WIRED RELAY STATIONS

CLAIM OF PRIORITY

This application claims priority to a Patent Application entitled "System Using Wired Relay Stations", filed in the Korean Intellectual Property Office on Nov. 21, 2006 and assigned Serial No. 2006-115087, the contents of which are incorporated herein by reference.

BACKGROUND OF THE INVENTION

1. Field of the Invention

The present invention relates generally to Radio Resource Management (RRM) of a cellular communication system having Relay Stations (RSs), i.e. a Radio over Fiber (RoF) cellular communication system, and in particular, to a method and system for variably assigning a sub-channel to a Mobile Station (MS) according to a channel state per sub-channel and the number of available channels per RS.

2. Description of the Related Art

One of the important technologies for the continuous development of a wireless communication system is related to efficient operation and distribution of frequency resources. The studies for the efficient operation and distribution of frequency resources have been briskly performed from a conventional single-hop transmission scheme, in which only a direct transmission from a Base Station (BS) per cell to a Mobile Station (MS) is allowed, to an expanded multi-hop transmission scheme. In a system supporting the multi-hop transmission scheme, a signal from a BS can be transmitted to a MS via a Relay Station (RS) or directly transmitted to the MS.

Examples of cellular systems, which are being implemented or have been realized, are a single-hop system, a repeater system supporting a repeater, and a multi-hop system. The single-hop system has a structure in which a BS exists in each cell without a repeater, and a terminal or MS is directly connected to the BS without any relay. The repeater system is to improve reception signal performance of a MS in a cell boundary area or shadow area by additionally installing a repeater between a BS and the MS. In the repeater system, a single cell is formed with a BS and a plurality of repeaters, and a MS transmits and receives a signal to and from the BS and repeater(s) at the same time. According to a link type between the BS and the repeaters, the repeaters can be divided into wired-optical repeaters and wireless-Radio Frequency (RF) repeaters. The wired repeaters have an advantage of low signal attenuation and a disadvantage of non-mobility, and the wireless repeaters have a disadvantage of amplifying and broadcasting all reception signals without distinguishing a signal desired by a MS from an interference signal. While the wireless repeaters can be installed with a cheap price, antenna isolation is needed in a network construction.

A difference between a wireless RS system and a wireless repeater system is as follows. While a wireless repeater transmits a signal by amplifying a signal from a BS and an interference signal from another cell, a wireless RS can amplify only a signal desired by a MS and perform the scheduling/Radio Resource Management (RRM) of MSs in a sub-cell formed using the RS. In other words, using a wireless RS, transmission can be performed even for MSs in a shadow area in which a BS cannot directly transmit data, resulting in an expansion of cell coverage and an increase of cell throughput.

As described above, transmission performance can be improved in a wireless RS multi-hop system compared to the single-hop or repeater system. However, the wireless RS multi-hop system requires additional transmission for a data relay compared to the single-hop system. Thus, limited resources must be shared by a plurality of sub-cells and relay links, and this may cause degradation of Quality of Service (QoS). That is, although a reception Signal to Interference pulse Noise Ratio (SINR) of a MS in a cell boundary area can be improved, since a portion of frame resources is used for relay transmission, available channel resources which can be assigned to MSs may be decreased, resulting in a decrease of throughput. One of reasons of this limitation is that data transmission/reception between a BS and a RS must be accomplished through a wireless link, and the same resource must be transmitted from the BS to the RS several times. Thus, studies of Radio over Fiber (RoF) RS technology (hereinafter, wired RS system) in which each cell is formed by connecting a BS and a RS using optical fiber having a good frequency characteristic and low data loss has been performed. A basic network configuration of the wired RS system is the same as that of the wireless RS multi-hop system except that a link between a BS and a RS or between RSs is wired.

The wired RS system has drawbacks in that expenses for optical cable installation between a BS and each RS are required, and it is difficult to move an installed RS. However, the wired RS system does not have signal loss between the BS and each RS and has a radio resource increase effect compared to the wireless RS system. In addition, by transmitting various control signals via a BS-RS wired section, a high-complex and high-efficient scheduling scheme, which is limited in the wireless RS system, can be applied. Due to these advantages, the wired RS system can achieve an increase in transmission throughput for each user and the entire cell. Since each RS acts as a small BS, the transmission throughput is increased proportional to the number of RSs in an ideal case compared to a single-hop system. Further, according to a change toward a gradual decrease of hardware costs and a gradual increase of frequency resource costs, it is predicted that the wired RS system eventually has more advantages than the wireless RS system.

SUMMARY OF THE INVENTION

An aspect of the present invention is to substantially solve at least the above problems and/or disadvantages and to provide at least the advantages below. Accordingly, an aspect of the present invention is to increase Quality of Service (QoS) of a Mobile Station (MS) (decrease non-operating probability of MSs which do not satisfying a minimum data rate) and mean cell throughput.

According to one aspect of the present invention, there is provided a method of assigning radio resources in a cellular system using wired Relay Stations (RSs), the method comprising: a Base Station (BS) gathering fed-back control information of all Mobile Stations (MSs) via the RSs in a cell of the BS; a first process, wherein the MSs are divided into two groups according to a channel state of each MS; a second process, wherein sub-channels are dynamically assigned to MSs belonging to a group, in which a channel state of each MS is good, of the two groups; and a third process, wherein sub-channels are dynamically assigned to MSs belonging to a group, in which a channel state of each MS is bad, of the two groups by considering a resource state per RS and a channel gain between sub-channels.

According to another aspect of the present invention, there is provided a system for assigning radio resources between wired Relay Stations (RSs) of a cellular system, the system comprising: a plurality of Mobile Stations (MSs) performing an update process by transmitting signal information and control information containing a resource demand and supply state to each RS and/or a Base Station (BS); and a plurality of BSs receiving the control information via a wired network and performing RS selection and radio resource assignment to each MS according to the number of RSs and the number of sub-channels.

BRIEF DESCRIPTION OF THE DRAWINGS

The above features and advantages of the present invention will become more apparent from the following detailed description when taken in conjunction with the accompanying drawing in which.

DETAILED DESCRIPTION OF THE INVENTION

Now, embodiments of the present invention will be described herein below with reference to the accompanying drawings. The invention may, however, be embodied in many different forms and should not be construed as being limited to the embodiments set forth herein; rather, these embodiments are provided so that this disclosure will be thorough and complete, and will fully convey the concept of the invention to those skilled in the art.

Figure 1:
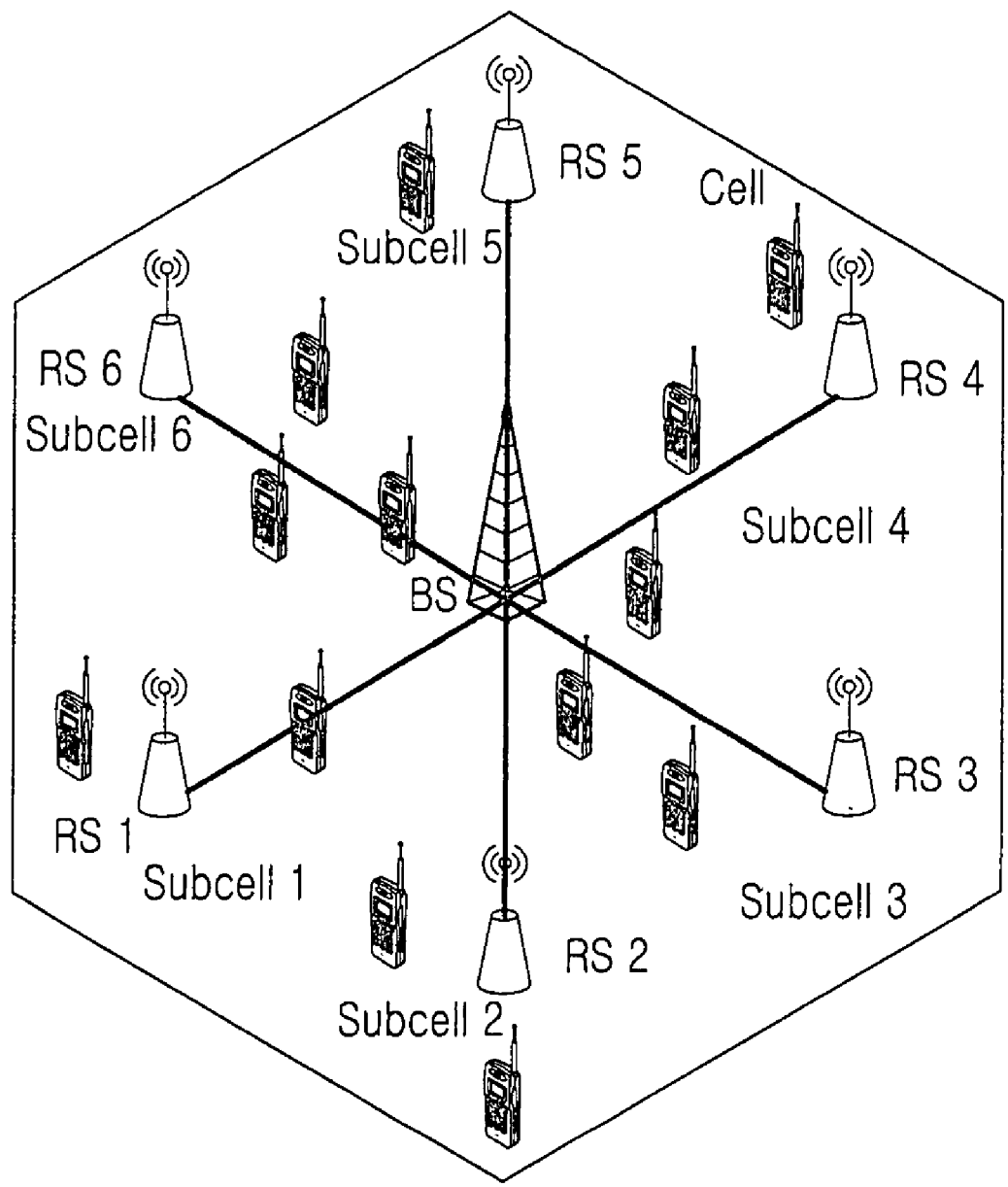
FIG. 1 is a configuration of a cellular system using wired Relay Stations (RSs) according to an exemplary embodiment of the present invention.

FIG. 1 is a configuration of a cellular system using wired Relay Stations (RSs) according to an exemplary embodiment of the present invention. As illustrated in FIG. 1, a single cell can be constituted of a single Base Station (BS) and a number of wired RSs, for example 6, each RS covering its sub-cell area. In the wired RS system, a Mobile Station (MS) close to the BS receives a service from the BS, and a MS located in a cell boundary, i.e. having a relatively low reception Signal to Interference pulse Noise Ratio (SINR), receives a service from an adjacent RS.

In the illustrative example shown in FIG. 1, the wired RS system (as in a wireless RS system) shows a cell-split effect from one cell to 7 cells due to the RSs. Such a wired RS multi-hop system provides an effect of expanding a service area of the BS and removing a shadow area by efficiently transmitting data to MSs, which are located in a cell boundary or an obstacle area in which a channel state is relatively poor due to a cell-split effect with the RSs.

In particular, unlike a wireless RS system, in the wired RS system illustrated in FIG. 1, a link between the BS and each RS is connected using optical fiber. Therefore, the wired RS system has problems that additional expenses are required to install optical cable between the BS and each RS, and it is difficult to move each RS once the RS is installed. However, there are some advantages with the wired RS system, as stated hereinafter.

Firstly, since the wired RS system uses optical cable, signal attenuation between the BS and each RS can be ignored. Secondly, since radio resources can be saved compared to the wireless RS system, the amount of resources, which can be assigned to users, is proportionally increased. Thirdly, more control signals can be transmitted due to the saving of radio resources. Thus, various intelligent scheduling schemes, which were limited in the wireless RS system, can be applied. Fourthly, compared to the wireless RS system, various multi-hop systems can be designed.

A transmission method according to an exemplary embodiment of the present invention, which can be applied to the wired RS system, uses Orthogonal Frequency Division Multiple Access (OFDMA) using multiple carriers. It is assumed that resource assignment to each MS is achieved per sub-channel. In this case, since fading channels of MSs are independent to each other, a sub-channel advantageous to each MS is selected, that is, a sub-channel is assigned to each MS using multi-user diversity (since the sub-channel assignment includes a case where a RS transmits data to a MS and a case where the BS directly transmits the data to the MS, hereinafter, 'RS' is used as terminology of a concept including both 'BS' and 'RS').

Since the wired RS system has a feature of supporting a plurality of RSs, unlike a single-hop OFDMA system, sub-channel assignment is achieved in the wired RS system as follows.

A RS for supporting a service to a specific MS is determined in advance, and sub-channel assignment is independently performed for MSs belonging to the determined RS. A method of determining a RS is performed by selecting a RS corresponding to the highest mean signal level of the entire band from among signals of RSs, which were received by each MS. That is, since a RS for each MS is determined and the sub-channel assignment is performed in each RS to which MSs belong, each process is independently performed. However, even if a MS located in a boundary of a sub-cell, which is a service area of a RS, has a higher mean signal level of the entire band, a signal level of an assigned sub-channel may be different from the trend of a mean signal level of the entire band.

Figure 2A:
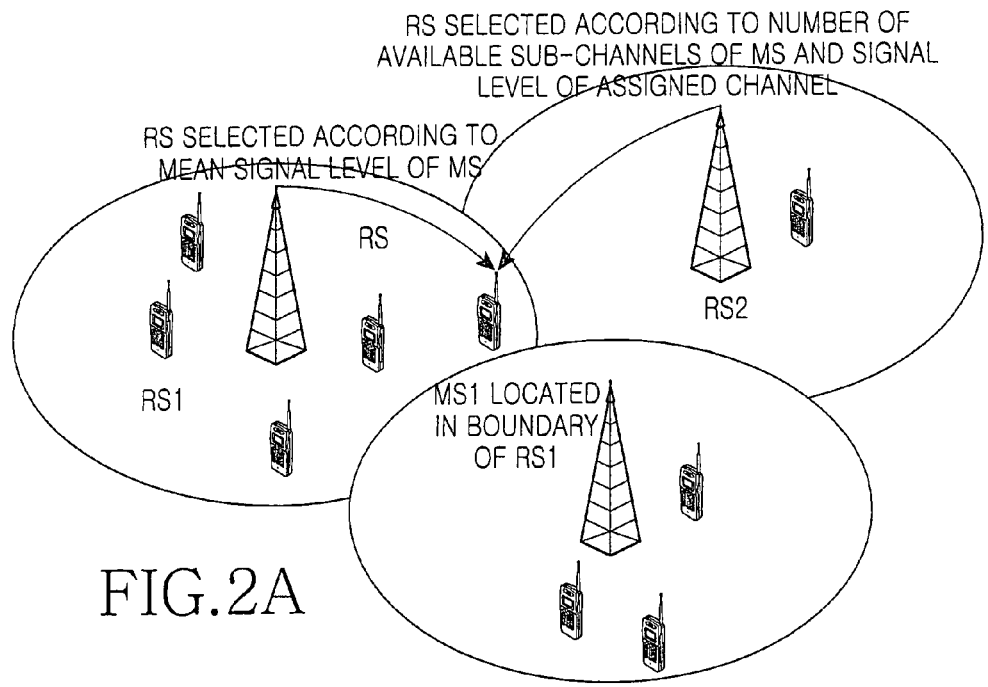
FIG. 2 illustrates RS selection and dynamic resource assignment of a Mobile Station (MS) located in a boundary of a RS in a cellular system using wired RSs according to an exemplary embodiment of the present invention.
Figures 2B, 2C:
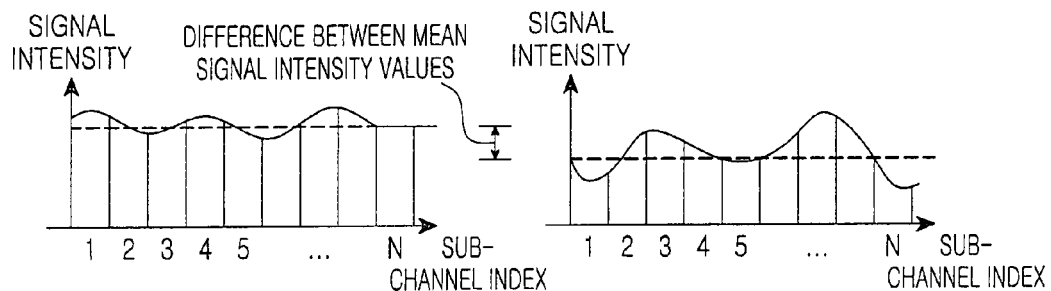
Figures 2D, 2E:
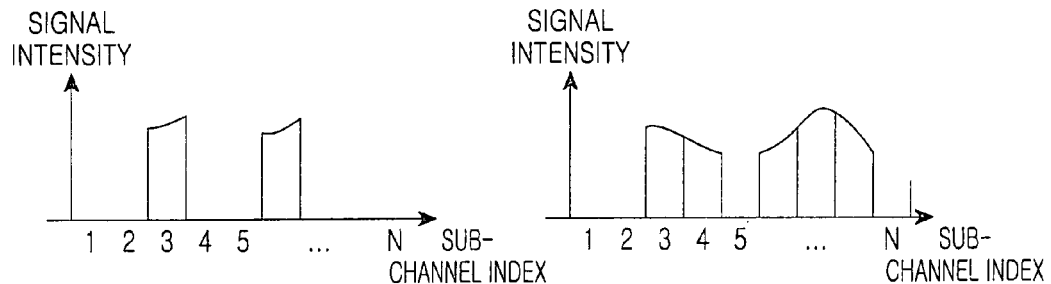

This situation is illustrated in FIG. 2. A MS1 illustrated in FIG. 2A is located in a boundary area between the coverage of a RS1 and the coverage of a RS2, and as illustrated in FIGS. 2B and 2C, a mean signal level received from the RS1 may be greater. However, due to a frequency selective characteristic of a channel, a sub-channel can be assigned to the MS1 so that a signal level received from the RS2 is greater as illustrated in FIGS. 2D and 2E. Thus, when a RS is selected for each MS located in the boundary of RS coverage, more correct dynamic resource assignment can be achieved by comparing signal levels of sub-channels to be assigned to each MS, instead of comparing mean signal levels of the entire band. In this case, the possibility that MSs concentratedly receive a service from a specific RS when a RS is selected for each MS according to the mean signal level of the entire band cannot be excluded. That is, since a given amount of resources is limited and the same per RS, if traffic increases in a specific RS, even if a channel state is good, no channel may be assigned, thus resulting in impossibility of operation. Thus, instead of independently considering the RS selection and the sub-channel assignment, it is necessary to consider both the RS selection and the sub-channel assignment at the same time.

In order to satisfy the above description, a system, in which each MS can transmit signal information and control information, such as a resource demand and supply state, received from a relevant RS back to the BS and RSs, must be assumed. Unlike the wireless RS system, since the control information is smoothly exchanged between the BS and each RS via a wired network in the wired RS system, the wired RS system can be a system that is easy to realize this assumption.

FIG. 3 is a flowchart illustrating a centralized resource assignment process for providing a dynamic resource assignment according to an exemplary embodiment of the present invention. As illustrated in FIG. 3A, the centralized resource assignment process may include an initialization process (step 311) and four subsequent processes <step 1> to <step 4>.

In step 311, in a wired RS cell structure, it is assumed for illustrative purposes that the number of RSs S=7 (1 BS+6 RSs), and it is defined that the total number of sub-channels is N and the total number of MSs is K. In addition, it is defined that a RS index is s (=1, 2, ..., S), a sub-channel index is n (=1, 2, ..., N), a MS index is k (=1, 2, ..., K), and a minimum data rate requested by each MS k is rk. It is also defined that $C_{k,n,s}$ is the number of transmission bits satisfying a target Bit Error Rate (BER) considering a signal level of a sub-channel n assigned to a MS k by a RS s (the number of transmission bits according to a Modulation & Coding Selection (MCS) level), and $\rho_{n,s}$ is a parameter having a value of k if a MS k uses a sub-channel n of a RS s or 0 if no sub-channel is assigned to a MS k. In the initial stage, this parameter is 0 since no sub-channel is assigned to any MS.

The <step 1> (step 312) is a process of dividing k MSs into a group A and a group B according to the conditions described below, the <step 2> (step 313) is a process of dynamically assigning sub-channels to MSs belonging to the group A, the <step 3> (step 314) is a process of dynamically assigning sub-channels to MSs belonging to the group B considering a resource state per RS and a channel gain between sub-channels, and the <step 4> (step 315) is a process of additionally assigning remaining sub-channels of each RS, which were not assigned in the <step 3>, to MSs of respective RSs. The entire operation can be performed by performing these processes.

Figure 3A:
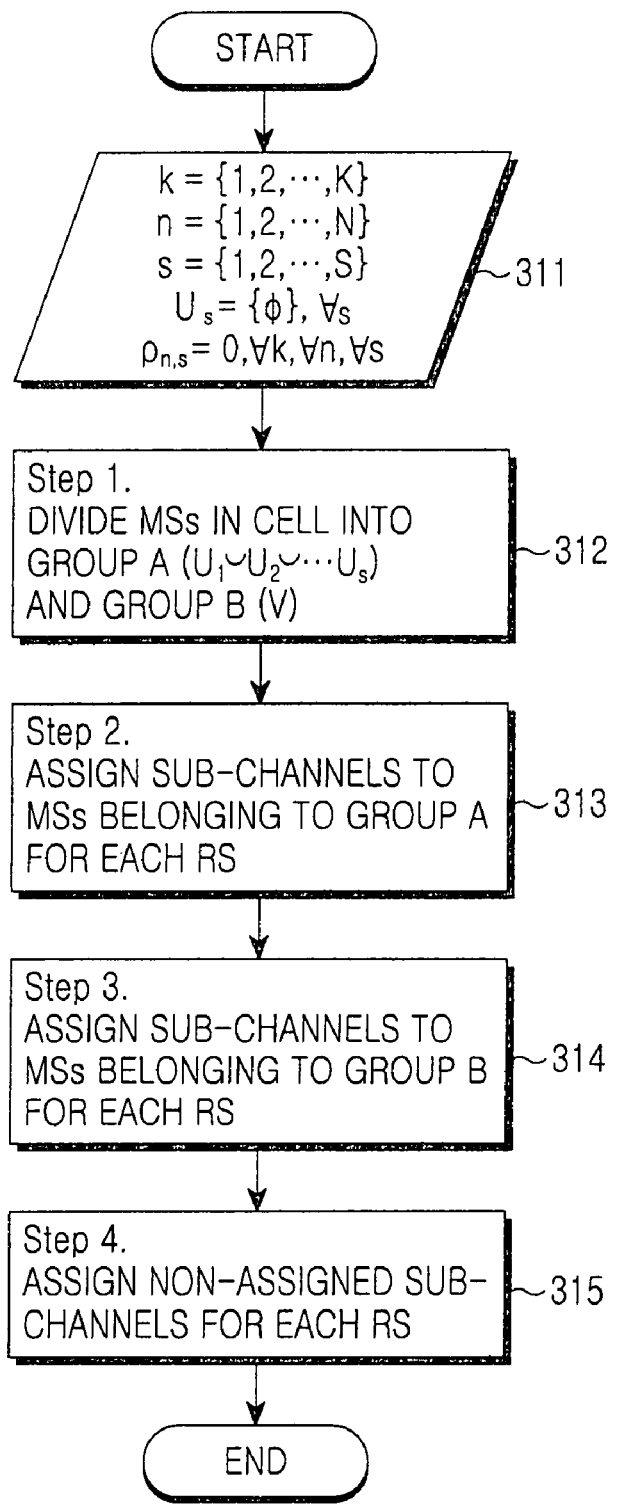
FIG. 3A is a flowchart illustrating a centralized resource assignment process for dynamic resource assignment according to an exemplary embodiment of the present invention.
Figure 3B:
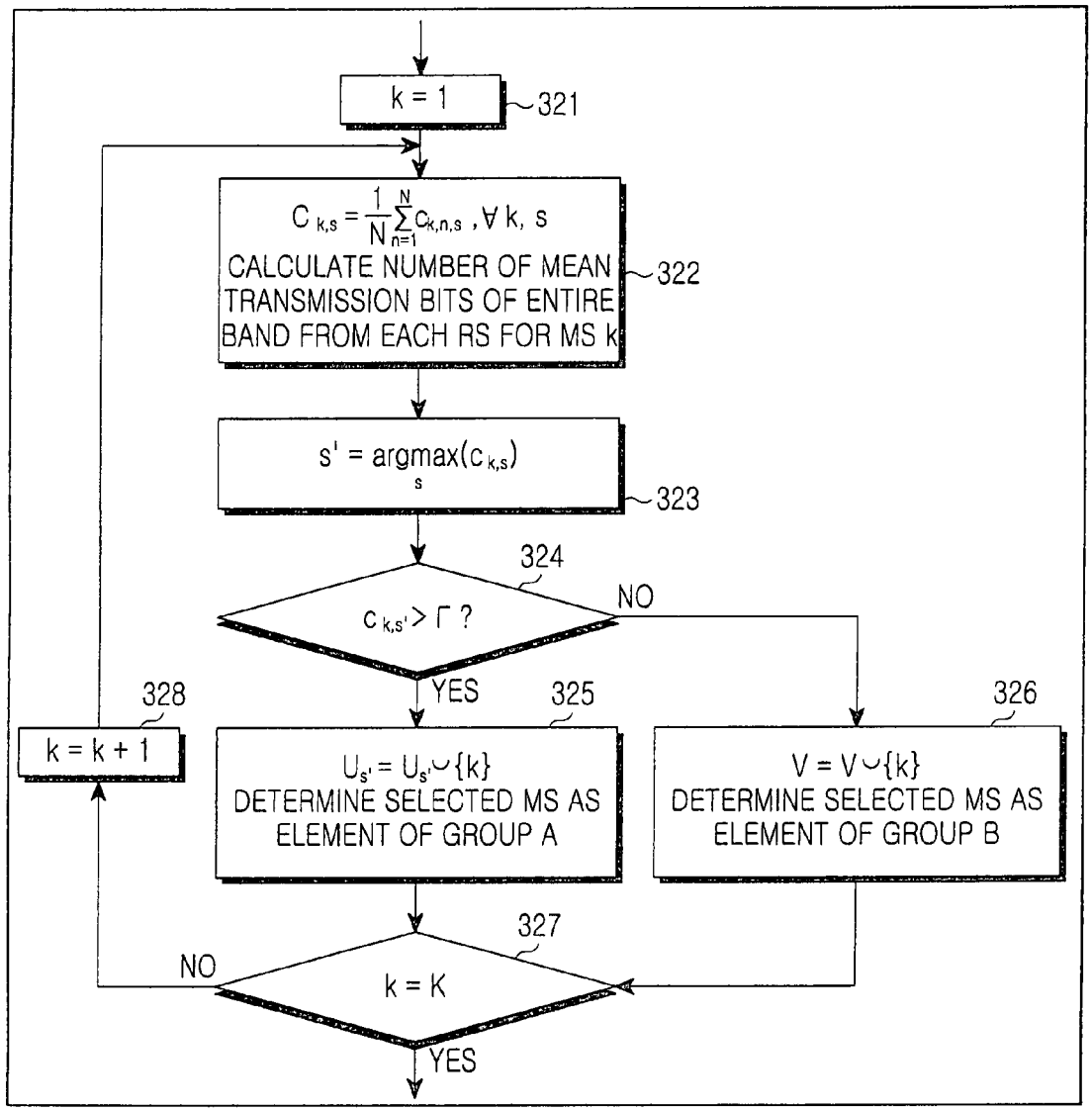
FIGS. 3B, 3C, 3D, and 3E are flowcharts of <step 1>, <step 2>, <step 3>, and <step 4> illustrated in FIG. 3A, respectively.

FIG. 3B is a flowchart of the <step 1> (step 312) illustrated in FIG. 3A. Referring to FIG. 3B, the <step 1> is performed by the BS by feeding back MS control information from all RSs. In this process, k MSs are divided into two groups. That is, k MSs are divided into the group A in which MSs are located relatively close to the BS or a relevant RS and the group B in which MSs are relatively located in a boundary area of a relevant RS. The dividing process can be accomplished by the algorithm illustrated in FIG. 3B.

In step 321, k is set to 1. In step 322, the number of mean transmission bits $C_{k,s}$, which a $k^{th}$ MS can receive from each RS using the entire sub-channels, is calculated. In step 323, a RS index corresponding to the greatest number of mean transmission bits among the numbers of mean transmission bits, i.e. $C_{k,s}$, calculated in step 322 is obtained. In step 324, the number of mean transmission bits $C_{k,s}$, corresponding to the RS index obtained in step 323 is compared to a threshold Γ. If the number of mean transmission bits $C_{k,s}$, is greater than the threshold Γ, the $k^{th}$ MS belongs to the group A, and a MS index is stored in a MS index set $U_s$ of a relevant RS in step 325. If the number of mean transmission bits $C_{k,s}$, is equal to or less than the threshold Γ, the $k^{th}$ MS belongs to the group B, the MS index is stored in a MS index set V in step 326. It is determined in step 327 whether k=K (the total number of MSs). If it is determined in step 327 that k≠K, k is increased by 1 in step 328, and the process goes back to step 322 and is repeated, applying the procedures to all MSs. If all MSs belong to the group A or B, the <step 1> ends, and the <step 2> starts.

Figure 3C:
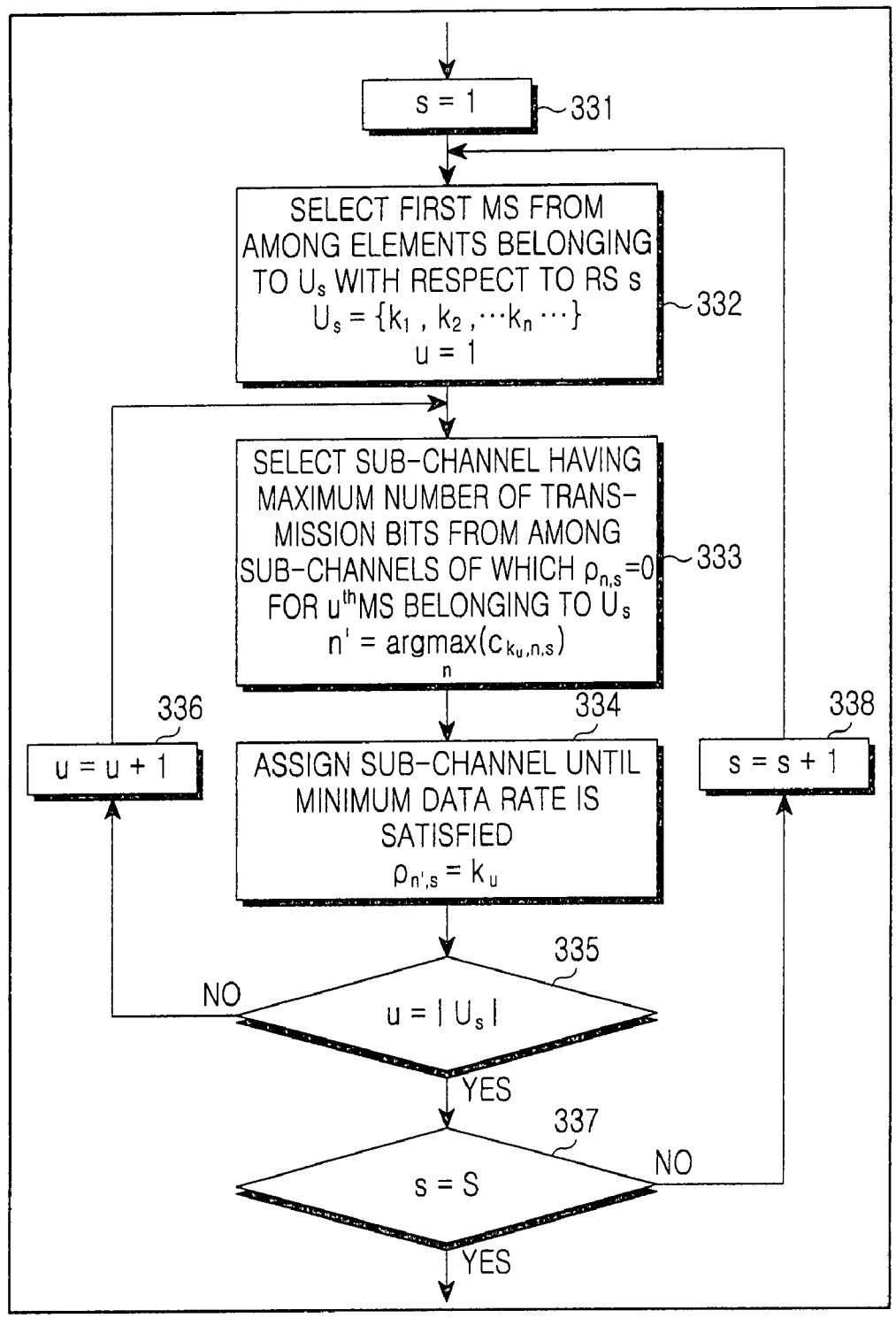

FIG. 3C is a flowchart of the <step 2> (step 313) illustrated in FIG. 3A. Referring to FIG. 3C, the <step 2> is a process of determining resource assignment for MSs belonging to the group A per RS and can be performed for RSs in parallel. In step 331, s is set to 1. Thereafter, a resource assignment is sequentially performed for MSs belonging to the group A, which are managed by a RS s. In step 332, a first MS is selected from elements of the group A, which are managed by the RS s, and a variable u is set to 1. Here, $k_1$ denotes an index of the first MS of $U_s$.

In step 333, in order to assign a sub-channel to the currently selected MS, i.e. $u^{th}$ MS, a sub-channel having the maximum number of transmission bits is selected from among sub-channels of which $\rho_{n,s}=0$. In step 334, a sub-channel is repeatedly assigned until a minimum data rate is satisfied. In step 335, it is determined whether the sub-channel assignment to all MSs belonging to the group A, which are managed by the RS s, has ended. If it is determined in step 335 that the sub-channel assignment to all MSs belonging to the group A, which are managed by the RS s, has ended, the process goes to step 337, and if it is determined in step 335 that the sub-channel assignment to all MSs belonging to the group A, which are managed by the RS s, has not ended, u is increased by 1 in step 336, and by going back to step 333 and repeating steps 333, 334 and 335, the sub-channel assignment to all MSs belonging to the group A, which are managed by the RS s, ends. In step 337, it is determined whether s=S (the total number of RSs). If it is determined in step 337 that s≠S, s is increased by 1 in step 338, and by going back to step 332 and repeating the steps, the sub-channel assignment to all MSs belonging to the group A, which are managed by a subsequent RS s, is performed. If the sub-channel assignment to all MSs belonging to the group A, which are managed by all RSs, ends, the <step 2> ends.

Figure 3D:
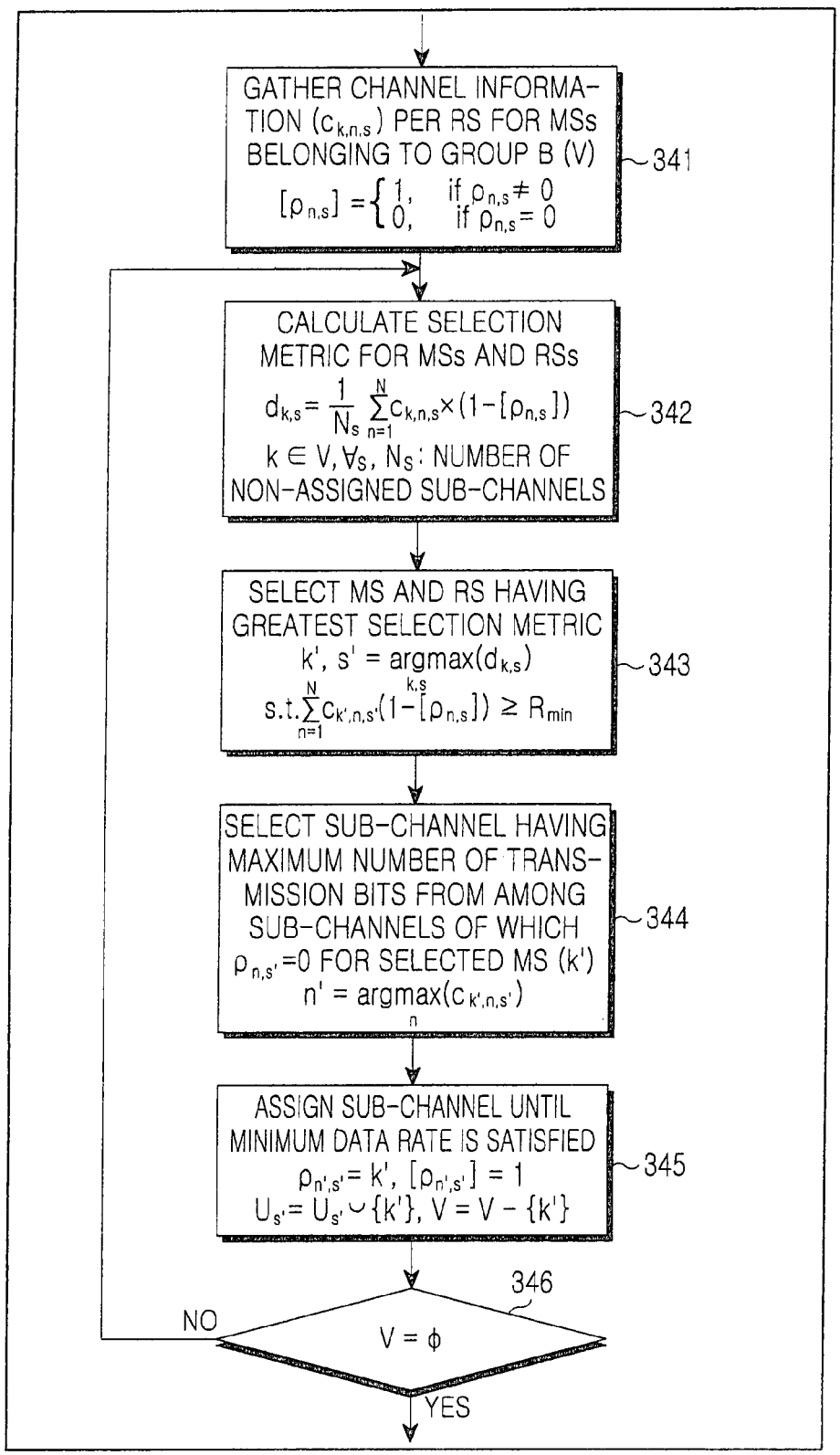

FIG. 3D is a flowchart of the <step 3> (step 314) illustrated in FIG. 3A. Referring to FIG. 3D, the <step 3> is a process of assigning sub-channels to MSs belonging to the group B, wherein non-assigned sub-channels (sub-channels of which $\rho_{n,s}=0$) per RS, which are remained after the <step 2> process ends, are assigned to MSs belonging to the group B. In step 341, channel information per RS is gathered for MSs belonging to the group B. In step 342, a metric for RS selection for all MSs and all RSs of the group B is calculated as represented by Equation 1.

$$d_{k,s} = \frac{1}{N_s} \sum_{n=1}^{N} c_{k,n,s}(1 - [\rho_{n,s}]) \quad (1)$$

$$[\rho_{n,s}] = \begin{cases} 1, & \text{if } \rho_{n,s} \neq 0 \\ 0, & \text{if } \rho_{n,s} = 0 \end{cases}$$

In Equation 1, $N_s$ denotes the number of non-assigned sub-channels per RS, and $[\rho_{n,s}]$ denotes a parameter having a value of 0 when $\rho_{n,s}=0$, i.e. when a sub-channel n of a RS s is not assigned to any MS or a value of 1 when a sub-channel n of a specific RS s is assigned to a specific MS.

In step 343, a pair of MS and RS ($d_{k,s}$) having the greatest selection metric is selected. In steps 344 and 345, sub-channels are assigned to the MS selected in step 343. A sub-channel assigning method used in steps 344 and 345 is selecting a sub-channel having the maximum number of transmission bits from among sub-channels, which can be assigned to the MS in the selected RS, (sub-channels of which $\rho_{n,s}=0$) in step 344 and repeatedly assigning a sub-channel in step 345 until a minimum data rate is satisfied. In this case, $\rho_{n',s'}$ of an assigned sub-channel is substituted by k', which is a MS index selected when $\rho_{n,s}=0$, and $\llcorner\rho_{n',s'}\lrcorner$ is substituted by 1. The above procedures are repeated for all MSs belonging to the group B until step 346 is satisfied, and if resources are assigned to all MSs belonging to the group B, the <step 3> ends.

Figure 3E:
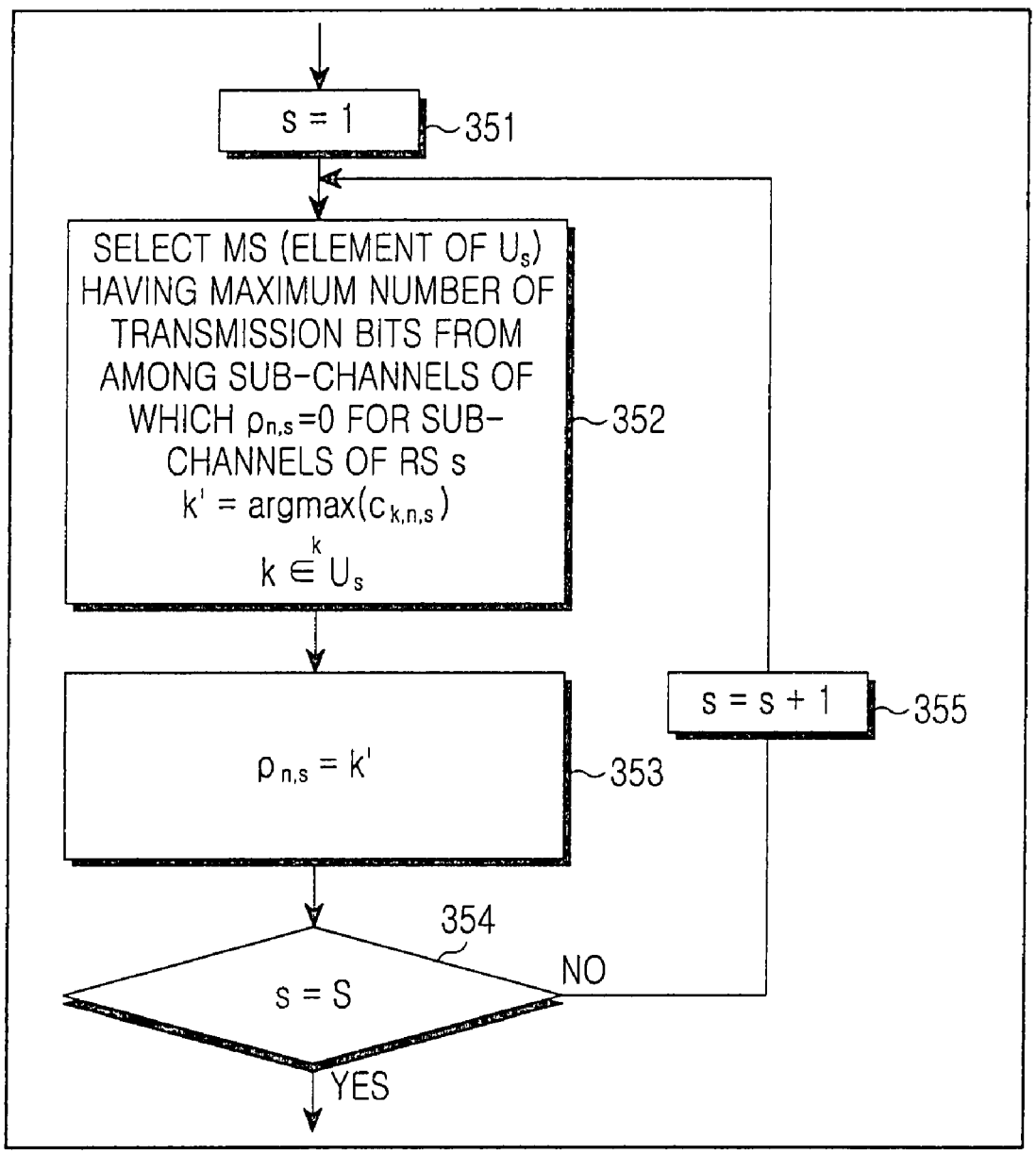

FIG. 3E is a flowchart of the <step 4> (step 315) illustrated in FIG. 3A. Referring to FIG. 3E, the <step 4> is a process of assigning non-assigned sub-channels when the non-assigned sub-channels exist even after the <step 3> process ends. In step 351, s is set to 1. a MS k' having the greatest number of transmission bits is selected from among MSs k for non-assigned sub-channels per RS s (sub-channels of which $\rho_{n,s}=0$) in step 352, $\rho_{n,s}$ is substituted by k' in step 353. Steps 352 and 353 are repeatedly performed until any non-assigned sub-channel does not exist, by determining in step 354 whether s=S, increasing s by 1 in step 355, and going back to step 352.

As described above, according to the teachings of the present invention, a dynamic resource assignment method in a wired RS system variably determines the resource assignment to MSs located in a sub-cell boundary according to traffic per RS in the wired RS system, wherein an efficient resource assignment to the MSs located in the sub-cell boundary can be performed by considering the signal level of a sub-channel to be assigned instead of a mean signal level. In addition, MSs are divided into groups A and B according to the quality of sub-channels, sub-channels are assigned according to the groups A and B, and sub-channels are assigned based on each RS in the case of MSs of the group A. Therefore, complexity can be reduced.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method of assigning radio resources in a cellular system using wired Relay Stations (RSs), the method comprising:
    a Base Station (BS) gathering feed-back control information of all Mobile Stations (MSs) via the RSs located in a cell of the BS;
    dividing the MSs into two groups according to a channel state of each MS;
    dynamically assigning sub-channels to the MSs belonging to one of the two groups, in which a channel state of each MS is above a predetermined quality;
    dynamically assigning sub-channels the MSs belonging to one of the two groups, in which a channel state of each MS is below the predetermined quality, by considering a resource state per RS and signal levels of sub-channels to be assigned to each MS.

2. The method of claim 1, wherein the dividing the MSs into two groups comprises:
    calculating the numbers of mean transmission bits per MS, which can be received from each RS using the entire sub-channels;
    obtaining a RS index corresponding to the greatest value among the numbers of mean transmission bits;
    comparing the number of mean transmission bits corresponding to the RS index to a pre-set threshold; and
    grouping a relevant MS according to a result of the comparison.

3. The method of claim 1, wherein the assigning sub-channels to the MSs belonging to one of the two groups, in which the channel state of each MS is above the predetermined quality comprises:
    selecting a sub-channel having the maximum number of transmission bits from among non-assigned sub-channels in order to assign a sub-channel to each MS; and
    repeatedly assigning a sub-channel to the MS until a minimum data rate of the MS is satisfied.

4. The method of claim 1, wherein the assigning sub-channels the MSs belonging to one of the two groups, in which the channel state of each MS is below the predetermined quality comprises:
    gathering channel information per RS for MSs belong to the channel state group below the predetermined quality; and
    calculating a metric for RS selection for all MSs and all RSs of the channel state group.

5. The method of claim 4, wherein the metric is represented by the equation below;
    selecting a pair of MS and RS ($d_{k,s}$) having the greatest selection metric as a result of the calculation;
    selecting a sub-channel having the maximum number of transmission bits from among non-assigned sub-channels in order to assign a sub-channel to the selected MS;
    repeatedly assigning a sub-channel until a minimum data rate of the MS is satisfied; and
    repeatedly performing the above steps for all MSs belong to the channel state group below the predetermined quality, $$d_{k,s} = \frac{1}{N_s} \sum_{n=1}^{N} c_{k,n,s}(1 - [\rho_{n,s}])$$

$$[\rho_{n,s}] = \begin{cases} 1, \text{ if } \rho_{n,s} \neq 0 \\ 0, \text{ if } \rho_{n,s} = 0 \end{cases},$$

where $N_s$ denotes the number of non-assigned sub-channels per RS, a RS index is s (=1, 2, ..., S), a sub-channel index is n (=1, 2, ..., N), a MS index is k=(1, 2, ..., K), a minimum data rate requested by each MS k is rk, $c_{k,n,s}$ is the number of transmission bits satisfying a target Bit Error Rate (BER) considering a signal level of a sub-channel n assigned to a MS k by a RS s, and $\rho_{n,s}$ is a parameter having a value of k if a MS k uses a sub-channel n of a RS s or 0 if no sub-channel is assigned to a MS k.

6. The method of claim 1, further comprising if a non-assigned sub-channel exists even after the processes end, selecting a MS having the greatest number of transmission bits from among MSs for the non-assigned sub-channel and assigning the non-assigned sub-channel to the selected MS.

7. A system programmed to perform the method of claim 1.

* * * * *